(12) United States Patent
Tsou et al.

(10) Patent No.: US 10,560,029 B2
(45) Date of Patent: Feb. 11, 2020

(54) CONTROLLER FOR INCREASING EFFICIENCY OF A POWER CONVERTER AND A RELATED METHOD THEREOF

(71) Applicant: Leadtrend Technology Corp., Hsinchu County (TW)

(72) Inventors: Ming-Chang Tsou, Hsinchu County (TW); Shun-Yao Liu, Hsinchu County (TW); Jiun-Sheng Huang, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 0 days.

(21) Appl. No.: 16/027,380

(22) Filed: Jul. 5, 2018

(65) Prior Publication Data

US 2018/0309371 A1 Oct. 25, 2018

Related U.S. Application Data

(62) Division of application No. 15/232,813, filed on Aug. 10, 2016, now abandoned.

(30) Foreign Application Priority Data

Sep. 7, 2015 (TW) .............................. 104129503 A

(51) Int. Cl.
*H02M 3/335* (2006.01)
*H02M 1/08* (2006.01)
(Continued)

(52) U.S. Cl.
CPC ......... *H02M 3/33523* (2013.01); *H02M 1/08* (2013.01); *H02M 1/44* (2013.01);
(Continued)

(58) Field of Classification Search
CPC ...... H02M 3/33523; H02M 1/08; H02M 1/44; H02M 7/06; H02M 2001/0029; H02M 2001/007
See application file for complete search history.

(56) References Cited

U.S. PATENT DOCUMENTS 7,342,328 B1 * 3/2008 Eddleman ................ H02J 1/10
307/80
9,590,511 B2 3/2017 Nate
(Continued)

FOREIGN PATENT DOCUMENTS

| CN | 102208864 A | 10/2011 |
|---|---|---|
| CN | 103166584 A | 6/2013 |
| CN | 103715890 A | 4/2014 |

*Primary Examiner* — Gary L Laxton
*Assistant Examiner* — Lakaisha Jackson
(74) *Attorney, Agent, or Firm* — Winston Hsu

(57) ABSTRACT

A controller for increasing efficiency of a power converter includes a comparison module and a gate signal generation unit. The comparison module is used for generating a detection voltage according to a direct current (DC) input voltage of a primary side of the power converter, and comparing the detection voltage with a predetermined value to generate a comparison result. The gate signal generation unit is used for changing a sink current flowing through a gate pin of the controller according to the comparison result, wherein the gate pin of the controller is coupled to a power switch of the primary side of the power converter.

11 Claims, 7 Drawing Sheets

(51) Int. Cl.
  *H02M 1/44* (2007.01)
  *H02M 7/06* (2006.01)
  *H02M 1/00* (2006.01)

(52) U.S. Cl.
  CPC ........ *H02M 7/06* (2013.01); *H02M 2001/007* (2013.01); *H02M 2001/0029* (2013.01)

(56) References Cited

U.S. PATENT DOCUMENTS

| | | | |
|---|---|---|---|
| 2013/0272033 A1* | 10/2013 | Zhang | H02M 3/33523 363/21.01 |
| 2015/0070078 A1* | 3/2015 | Jeong | H01L 29/7393 327/478 |
| 2015/0098255 A1 | 4/2015 | Nate | |
| 2015/0311692 A1* | 10/2015 | Hiyama | H03K 17/0828 361/31 |
| 2017/0126222 A1* | 5/2017 | O'Sullivan | H03K 17/0822 |

* cited by examiner

CONTROLLER FOR INCREASING EFFICIENCY OF A POWER CONVERTER AND A RELATED METHOD THEREOF

CROSS REFERENCE TO RELATED APPLICATIONS

This is a division of U.S. patent application Ser. No. 15/232,813, filed on 2016 Aug. 10.

BACKGROUND OF THE INVENTION

1. Field of the Invention

The present invention relates to a controller for increasing efficiency of a power converter and a related method thereof, and particularly to a controller and a related method thereof that can change a current flowing through a gate pin of the controller coupled to a power switch of the power converter to increase efficiency of the power converter.

2. Description of the Prior Art

The US Department of Energy has requested that efficiency of a next generation external power adapter needs to meet the VI level power specification. To make the efficiency of the next generation external power adapter meet the VI level power specification, a designer of a power converter applied to the next generation external power adapter may need to significantly change a design of the power converter provided by the prior art, resulting in cost of the power converter applied to the next generation external power adapter being significantly increased. In addition, if a sink current flowing through a gate pin of a controller is increased (wherein the gate pin of the controller is coupled to a power switch of a primary side of the power converter), efficiency of the power converter can be increased without significant increase of the cost of the power converter. However, electromagnetic interference of the power converter will be increased due to increase of the sink current flowing through the gate pin of the controller. Therefore, how to increase the efficiency of the power converter without significant increase of the electromagnetic interference of the power converter has become an important issue of the designer of the power converter.

SUMMARY OF THE INVENTION

An embodiment of the present invention provides a controller for increasing efficiency of a power converter. The controller includes a comparison module and a gate signal generation unit. The comparison module is used for generating a detection voltage according to a direct current (DC) input voltage of a primary side of the power converter, and comparing the detection voltage with a predetermined value to generate a comparison result. The gate signal generation unit is used for changing a sink current flowing through a gate pin of the controller according to the comparison result, wherein the gate pin is coupled to a power switch of the primary side of the power converter.

Another embodiment of the present invention provides a controller for increasing efficiency of a power converter. The controller includes an enable signal generation unit and a gate signal generation unit. The enable signal generation unit is used for generating an enable signal corresponding to a duty cycle of a gate control signal according to a DC input voltage corresponding to a primary side of the power converter and a feedback voltage corresponding to a secondary side of the power converter, wherein the feedback voltage corresponds to an output voltage of the secondary side of the power converter. The gate signal generation unit is used for changing a sink current flowing through a gate pin of the controller according to the enable signal, wherein the gate pin is coupled to a power switch of the primary side of the power converter, and the gate signal generation unit is further used for generating a gate control signal to the power switch.

Another embodiment of the present invention provides a method for increasing efficiency of a power converter, wherein a controller applied to the method includes a high voltage pin, a comparison module, and a gate signal generation unit, and the comparison module includes a detection voltage generation unit and a comparator. The method includes the high voltage pin receiving a DC input voltage from a primary side of the power converter; the detection voltage generation unit generating a detection voltage according to the DC input voltage; the comparator comparing the detection voltage with a predetermined value to generate a comparison result; and the gate signal generation unit changing a sink current flowing through a gate pin of the controller according to the comparison result.

Another embodiment of the present invention provides a method for increasing efficiency of a power converter, wherein a controller applied to the method includes an auxiliary pin, a comparison module, and a gate signal generation unit, and the comparison module includes a detection voltage generation unit and a comparator. The method includes the auxiliary pin receiving an auxiliary voltage from a voltage divider coupled to an auxiliary winding of the power converter, wherein the auxiliary voltage corresponds to a DC input voltage; the detection voltage generation unit generating a detection voltage according to the auxiliary voltage; the comparator comparing the detection voltage with a predetermined value to generate a comparison result; and the gate signal generation unit changing a sink current flowing through a gate pin of the controller according to the comparison result, wherein the gate pin is coupled to a power switch of a primary side of the power converter.

Another embodiment of the present invention provides a method for increasing efficiency of a power converter, wherein a controller applied to the method includes a high voltage pin, an enable signal generation unit, and a gate signal generation unit. The method includes the high voltage pin receiving a DC input voltage from a primary side of the power converter; the enable signal generation unit generating an enable signal corresponding to a duty cycle of a gate control signal according to the DC input voltage and a feedback voltage corresponding to a secondary side of the power converter, wherein the feedback voltage corresponds to an output voltage of the secondary side of the power converter; and the gate signal generation unit changing a sink current flowing through the gate pin of the controller according to the enable signal.

The present invention provides a controller for increasing efficiency of a power converter and a related method thereof. The controller and the method utilize a comparison module to generate a detection voltage according to a DC input voltage corresponding to a primary side of the power converter and to compare the detection voltage with a predetermined value to generate a comparison result, and utilize a gate signal generation unit to increase a sink current flowing through a gate pin of the controller according to the comparison result. In addition, the controller and the method can also utilize an enable signal generation unit to generate an enable signal corresponding to a duty cycle of a gate control signal according to the DC input voltage corresponding to the primary side of the power converter and a feedback voltage corresponding to a secondary side of the power converter, and utilize the gate signal generation unit to increase the sink current flowing through the gate pin of the controller according to the enable signal. Therefore, when the sink current flowing through the gate pin of the controller is increased and the gate control signal is changed from high to low, because the sink current flowing through the gate pin of the controller is increased, the gate control signal can be quickly changed from high to low. That is to say, a power switch of the primary side of the power converter can be switched quickly, resulting in the efficiency of the power converter being better. Although when the power switch of the primary side of the power converter is switched quickly, electromagnetic interference of the power converter is increased, the electromagnetic interference of the power converter can be eliminated easily because the DC input voltage is a low voltage. Therefore, compared to the prior art, the present invention can increase the efficiency of the power converter without significant increase of cost of the power converter These and other objectives of the present invention will no doubt become obvious to those of ordinary skill in the art after reading the following detailed description of the preferred embodiment that is illustrated in the various figures and drawings.

DETAILED DESCRIPTION

Figure 1:
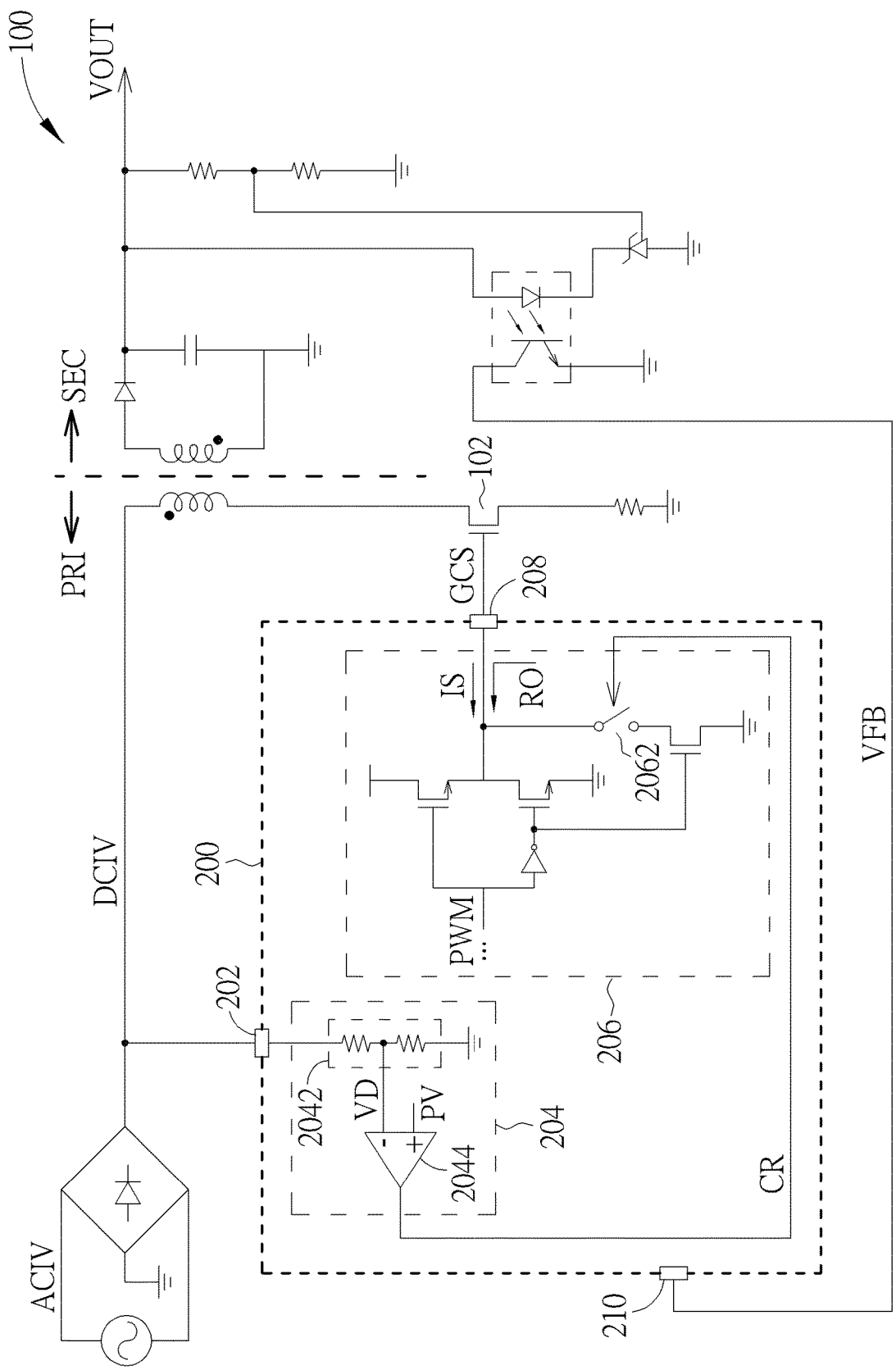
FIG. 1 is a diagram illustrating a controller for increasing efficiency of a power converter according to a first embodiment of the present invention.

Please refer to FIG. 1. FIG. 1 is a diagram illustrating a controller 200 for increasing efficiency of a power converter 100 according to a first embodiment of the present invention. As shown in FIG. 1, the controller 200 includes a high voltage pin 202, a comparison module 204, and a gate signal generation unit 206, wherein the comparison module 204 includes a detection voltage generation unit 2042 and a comparator 2044. As shown in FIG. 1, the high voltage pin 202 can receive a direct current (DC) input voltage DCIV from a primary side PRI of the power converter 100, wherein the DC input voltage DCIV corresponds to an alternating current (AC) input voltage ACIV inputted to the power converter 100. The detection voltage generation unit 2042 of the comparison module 204 is coupled to the high voltage pin 202 for generating a detection voltage VD according to the DC input voltage DCIV of the primary side PRI of the power converter 100, wherein the detection voltage VD is a divided voltage of the DC input voltage DCIV. In addition, the comparator 2044 of the comparison module 204 is used for comparing the detection voltage VD and a predetermined value PV to generate a comparison result CR. That is to say, when the detection voltage VD (the divided voltage of the DC input voltage DCIV) is lower than the predetermined value PV, the comparator 2044 generates a comparison result CR. As shown in FIG. 1, after the comparator 2044 generates the comparison result CR, a switch 2062 of the gate signal generation unit 206 can be turned on according to the comparison result CR, resulting in an output resistor RO of the gate signal generation unit 206 being decreased. Because the output resistor RO of the gate signal generation unit 206 is decreased, a sink current IS flowing through a gate pin 208 of the controller 200 is increased, wherein as shown in FIG. 1, the gate pin 208 is coupled to a power switch 102 of the primary side PRI of the power converter 100. In addition, the gate signal generation unit 206 is further used for generating a gate control signal GCS to the power switch 102 according to a pulse width modulation signal PWM, wherein the pulse width modulation signal PWM is generated according to a feedback voltage VFB received by a compensation pin 210 of the controller 200, the feedback voltage VFB corresponds to an output voltage VOUT of a secondary side SEC of the power converter 100, and the power switch 102 is turned on and turned off according to the gate control signal GCS. Thus, when the sink current IS flowing through the gate pin 208 of the controller 200 is increased and the gate control signal GCS is changed from high to low, because the sink current IS flowing through the gate pin 208 of the controller 200 is increased, the gate control signal GCS can be quickly changed from high to low (shown in FIG. 2), that is, the power switch 102 can be switched quickly, resulting in the efficiency of the power converter 100 being better. Although when the power switch 102 is switched quickly, electromagnetic interference of the power converter 100 is increased, the electromagnetic interference of the power converter 100 can be eliminated easily because the DC input voltage DCIV is a low voltage (because the detection voltage VD is lower than the predetermined value PV). Therefore, compared to the prior art, because the controller 200 utilizes the switch 2062 to change the sink current IS according to the comparison result CR, cost of the power converter 100 is not increased significantly and the efficiency of the power converter 100 can be increased. In addition, when the detection voltage VD (the divided voltage of the DC input voltage DCIV) is higher than the predetermined value PV, the comparator 2044 does not generate the comparison result CR, resulting in the switch 2062 of the gate signal generation unit 206 being turned off. Because the comparator 2044 does not generate the comparison result CR, the output resistor RO of the gate signal generation unit 206 is increased. Because the output resistor RO of the gate signal generation unit 206 is increased, the sink current IS flowing through the gate pin 208 of the controller 200 is decreased.

In addition, in another embodiment of the present invention, the comparator 2044 generates the comparison result CR when the detection voltage VD (the divided voltage of the DC input voltage DCIV) is higher than the predetermined value PV, resulting in the switch 2062 of the gate signal generation unit 206 being turned off (meanwhile, the switch 2062 is a P-type metal-oxide-semiconductor transistor or a transmission gate). Because the switch 2062 is turned off, the output resistor RO of the gate signal generation unit 206 is increased. Because the output resistor RO of the gate signal generation unit 206 is increased, the sink current IS flowing through the gate pin 208 of the controller 200 is decreased.

Figure 3:
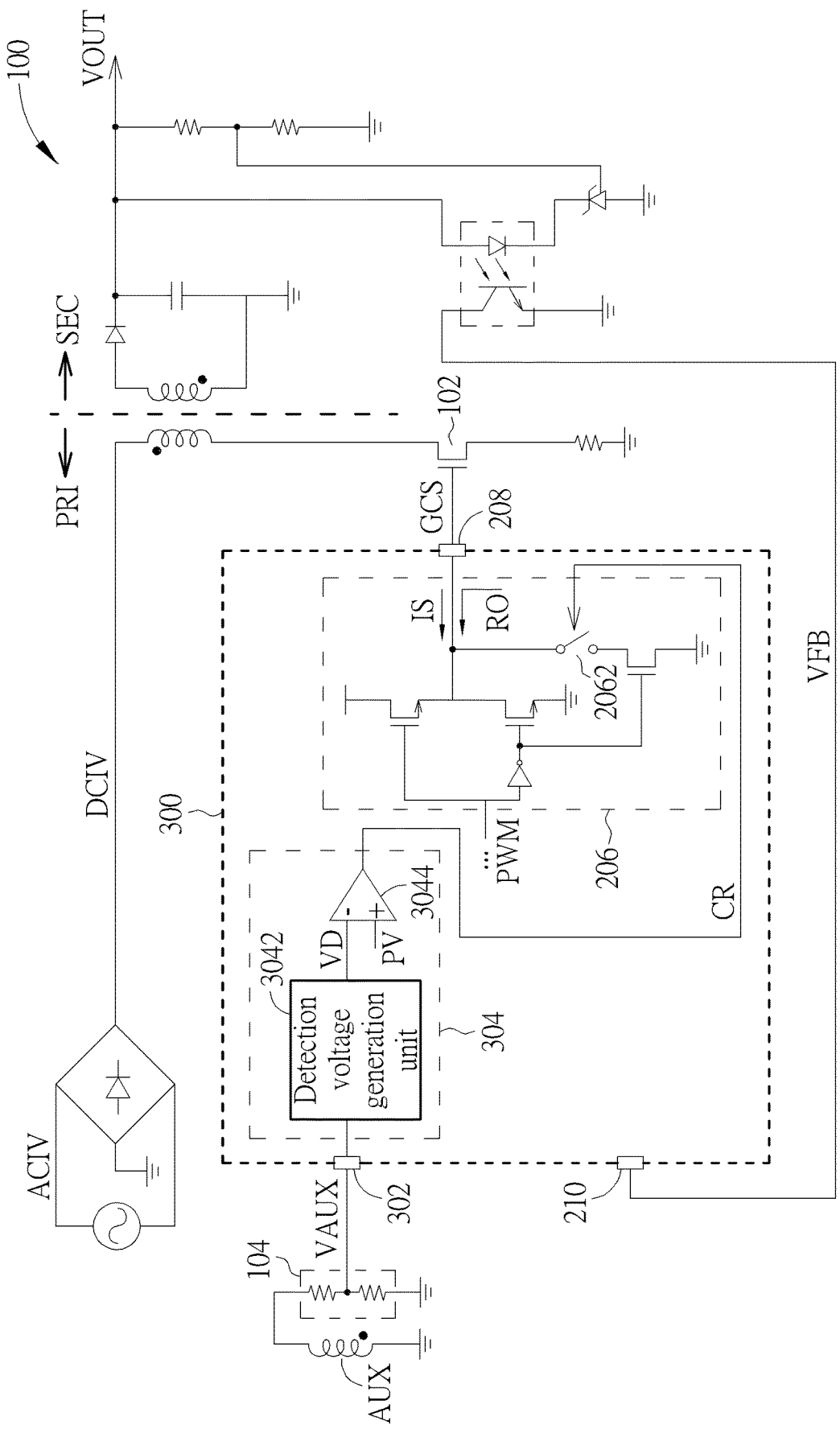
FIG. 3 is a diagram illustrating a controller for increasing the efficiency of the power converter according to a second embodiment of the present invention.

Please refer to FIG. 3. FIG. 3 is a diagram illustrating a controller 300 for increasing the efficiency of the power converter 100 according to a second embodiment of the present invention. As shown in FIG. 3, the controller 300 includes an auxiliary pin 302, a comparison module 304, and the gate signal generation unit 206, wherein the comparison module 304 includes a detection voltage generation unit 3042 and a comparator 3044. As shown in FIG. 3, the auxiliary pin 302 is used for receiving an auxiliary voltage VAUX from a voltage divider 104 coupled to an auxiliary winding AUX of the power converter 100, wherein the auxiliary voltage VAUX corresponds to the DC input voltage DCIV of the primary side PRI of the power converter 100, and the DC input voltage DCIV corresponds to the AC input voltage ACIV inputted to the power converter 100. The detection voltage generation unit 3042 included in the comparison module 304 is coupled to the auxiliary pin 302 for generating the detection voltage VD according to the auxiliary voltage VAUX. In addition, the comparator 3044 included in the comparison module 304 is used for comparing the detection voltage VD with the predetermined value PV to generate the comparison result CR. That is to say, when the detection voltage VD is lower than the predetermined value PV, the comparator 3044 generates the comparison result CR. In addition, as shown in FIG. 3, after the comparator 3044 generates the comparison result CR, subsequent operational principles of the controller 300 are the same as those of the controller 100, so further description thereof is omitted for simplicity.

Figure 4:
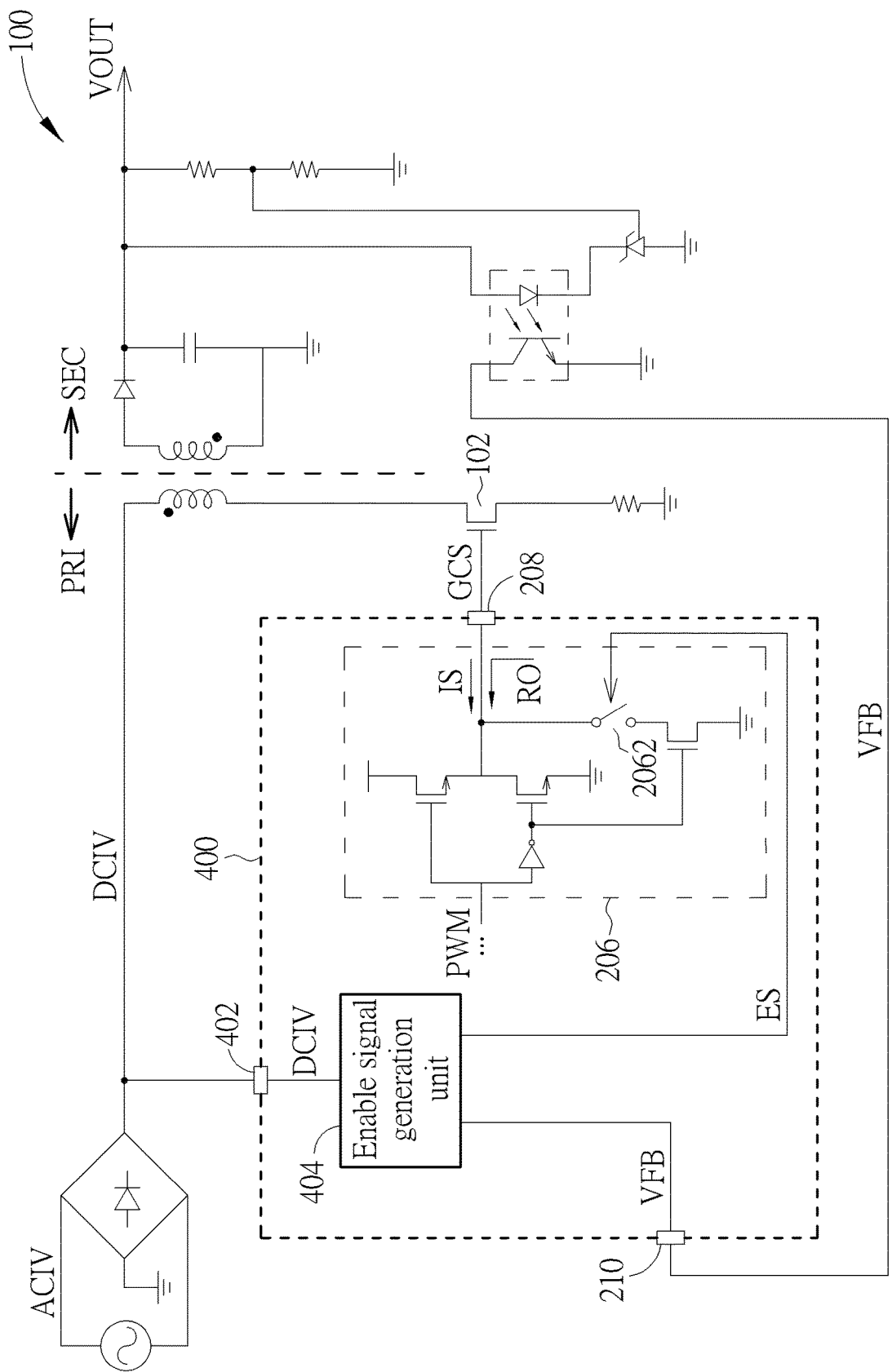
FIG. 4 is a diagram illustrating a controller for increasing the efficiency of the power converter according to a third embodiment of the present invention.

Please refer to FIG. 4. FIG. 4 is a diagram illustrating a controller 400 for increasing the efficiency of the power converter 100 according to a third embodiment of the present invention. As shown in FIG. 4, the controller 400 includes a high voltage pin 402, an enable signal generation unit 404, and the gate signal generation unit 206. As shown in FIG. 4, the high voltage pin 402 can receive the DC input voltage DCIV from the primary side PRI of the power converter 100, wherein the DC input voltage DCIV corresponds to the AC input voltage ACIV inputted to the power converter 100. The enable signal generation unit 404 is coupled to the high voltage pin 402 for generating an enable signal ES corresponding to a duty cycle D of the gate control signal GCS according to the DC input voltage DCIV of the primary side PRI of the power converter 100 and the feedback voltage VFB corresponding to the secondary side SEC of the power converter 100, wherein relationships between the duty cycle D of the gate control signal GCS, the DC input voltage DCIV, and the feedback voltage VFB can be determined according to equation (1).

$$\frac{VOUT}{DCIV} = \frac{D}{1-D} \times N = \frac{VFB \times k}{DCIV} \quad (1)$$

$$\frac{VFB}{DCIV} = \frac{D}{1-D} \times \frac{N}{k}$$

As shown in equation (1), k is a constant, VOUT is the output voltage of the secondary side SEC of the power converter 100, and N is a turns ratio of a winding of the primary side PRI of the power converter 100 to a winding of the secondary side SEC of the power converter 100. In addition, as shown in FIG. 4, the feedback voltage VFB is received by a compensation pin 210 of the controller 400, and the feedback voltage VFB corresponds to the output voltage VOUT of the secondary side SEC of the power converter 100. Therefore, the enable signal generation unit 404 generates the enable signal ES to the gate signal generation unit 206 when the duty cycle D of the gate control signal GCS is greater than a predetermined value, wherein as shown in equation (1), when the duty cycle D of the gate control signal GCS is greater than the predetermined value, the DC input voltage DCIV is less than a predetermined voltage value. In addition, as shown in FIG. 4, after the enable signal generation unit 404 generates the enable signal ES to the gate signal generation unit 206, subsequent operational principles of the controller 400 are the same as those of the controller 100, so further description thereof is omitted for simplicity.

In addition, in another embodiment of the present invention, the enable signal generation unit 404 generates the enable signal ES when the duty cycle D of the gate control signal GCS is less than the predetermined value, resulting in the switch 2062 of the gate signal generation unit 206 being turned off. Because the switch 2062 is turned off, the output resistor RO of the gate signal generation unit 206 is increased. Because the output resistor RO of the gate signal generation unit 206 is increased, a sink current IS flowing through a gate pin 208 of the controller 400 is decreased.

Figure 2:
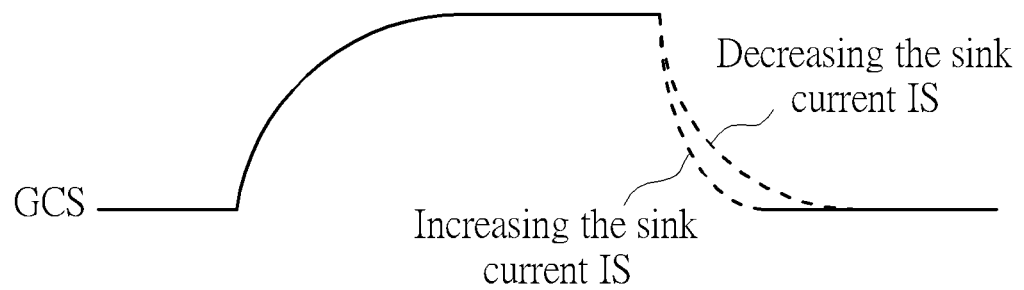
FIG. 2 is a diagram illustrating the gate control signal being quickly changed from high to low when the sink current flowing through the gate pin of the controller is increased.
Figure 5:
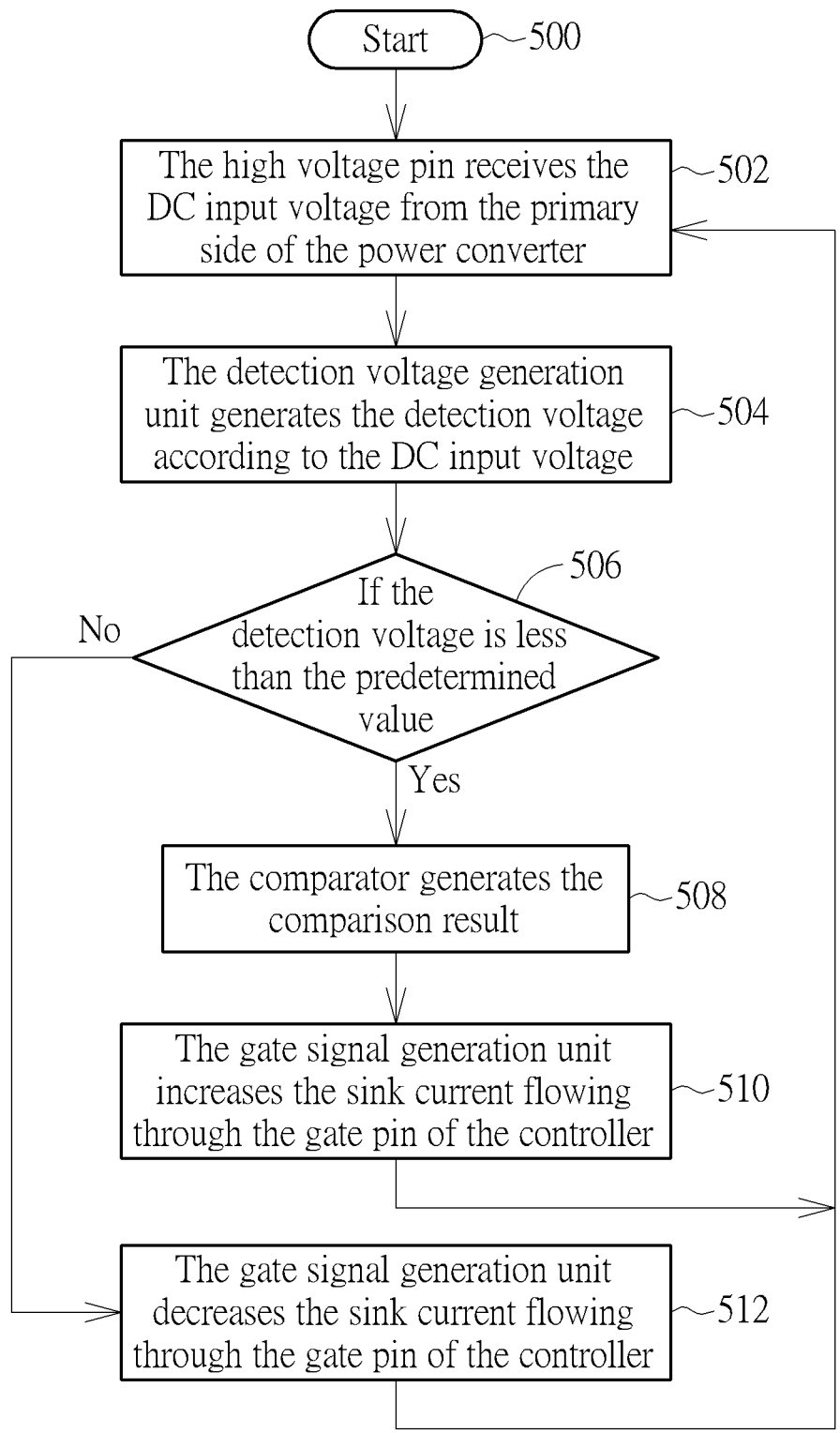
FIG. 5 is a flowchart illustrating a method for increasing efficiency of a power converter according to a fourth embodiment of the present invention.

Please refer to FIGS. 1, 2, 5. FIG. 5 is a flowchart illustrating a method for increasing efficiency of a power converter according to a fourth embodiment of the present invention. The method in FIG. 5 is illustrated using the power converter 100 and the controller 200 in FIG. 1. Detailed steps are as follows:

Step 500: Start.
Step 502: The high voltage pin 202 receives the DC input voltage DCIV from the primary side PRI of the power converter 100.
Step 504: The detection voltage generation unit 2042 generates the detection voltage VD according to the DC input voltage DCIV.
Step 506: If the detection voltage VD is less than the predetermined value PV; if yes, go to Step 508; if no, go to Step 512.
Step 508: The comparator 2044 generates the comparison result CR.
Step 510: The gate signal generation unit 206 increases the sink current IS flowing through the gate pin 208 of the controller 200, go to Step 502.
Step 512: The gate signal generation unit 206 decreases the sink current IS flowing through the gate pin 208 of the controller 200, go to Step 502.

In Step 502, as shown in FIG. 1, high voltage pin 202 can receive the DC input voltage DCIV from the primary side PRI of the power converter 100, wherein the DC input voltage DCIV corresponds to the AC input voltage ACIV inputted to the power converter 100. In Step 504, the detection voltage generation unit 2042 of the comparison module 204 can generate the detection voltage VD according to the DC input voltage DCIV of the primary side PRI of the power converter 100, wherein the detection voltage VD is the divided voltage of the DC input voltage DCIV. In addition, in Step 508, the comparator 2044 of the comparison module 204 generates the comparison result CR when the detection voltage VD (the divided voltage of the DC input voltage DCIV) is lower than the predetermined value PV. In Step 510, as shown in FIG. 1, after the comparator 2044 generates the comparison result CR, the switch 2062 of the gate signal generation unit 206 can be turned on according to the comparison result CR, resulting in the output resistor RO of the gate signal generation unit 206 being decreased. Because the output resistor RO of the gate signal generation unit 206 is decreased, the sink current IS flowing through the gate pin 208 of the controller 200 is increased. Thus, when the sink current IS flowing through the gate pin 208 of the controller 200 is increased and the gate control signal GCS is changed from high to low, because the sink current IS flowing through the gate pin 208 of the controller 200 is increased, the gate control signal GCS can be quickly changed from high to low (shown in FIG. 2), that is, the power switch 102 can be switched quickly, resulting in the efficiency of the power converter 100 being better. Although when the power switch 102 can be switched quickly, the electromagnetic interference of the power converter 100 is also increased, the electromagnetic interference of the power converter 100 can be eliminated easily because the DC input voltage DCIV is a low voltage (because the detection voltage VD is lower than the predetermined value PV). Therefore, compared to the prior art, because the controller 200 utilizes the switch 2062 to change the sink current IS according to the comparison result CR, the cost of the power converter 100 is not increased significantly and the efficiency of the power converter 100 can be increased. In addition, in Step 512, when the detection voltage VD (the divided voltage of the DC input voltage DCIV) is higher than the predetermined value PV, the comparator 2044 does not generate the comparison result CR, resulting in the switch 2062 of the gate signal generation unit 206 being turned off. Because the comparator 2044 does not generate the comparison result CR, the output resistor RO of the gate signal generation unit 206 is increased. Because the output resistor RO of the gate signal generation unit 206 is increased, the sink current IS flowing through the gate pin 208 of the controller 200 is decreased.

In addition, in another embodiment of the present invention, the comparator 2044 generates the comparison result CR when the detection voltage VD (the divided voltage of the DC input voltage DCIV) is higher than the predetermined value PV, resulting in the switch 2062 of the gate signal generation unit 206 being turned off (meanwhile, the switch 2062 is a P-type metal-oxide-semiconductor transistor or a transmission gate). Because the switch 2062 is turned off, the output resistor RO of the gate signal generation unit 206 is increased. Because the output resistor RO of the gate signal generation unit 206 is increased, the sink current IS flowing through the gate pin 208 of the controller 200 is decreased.

Figure 6:
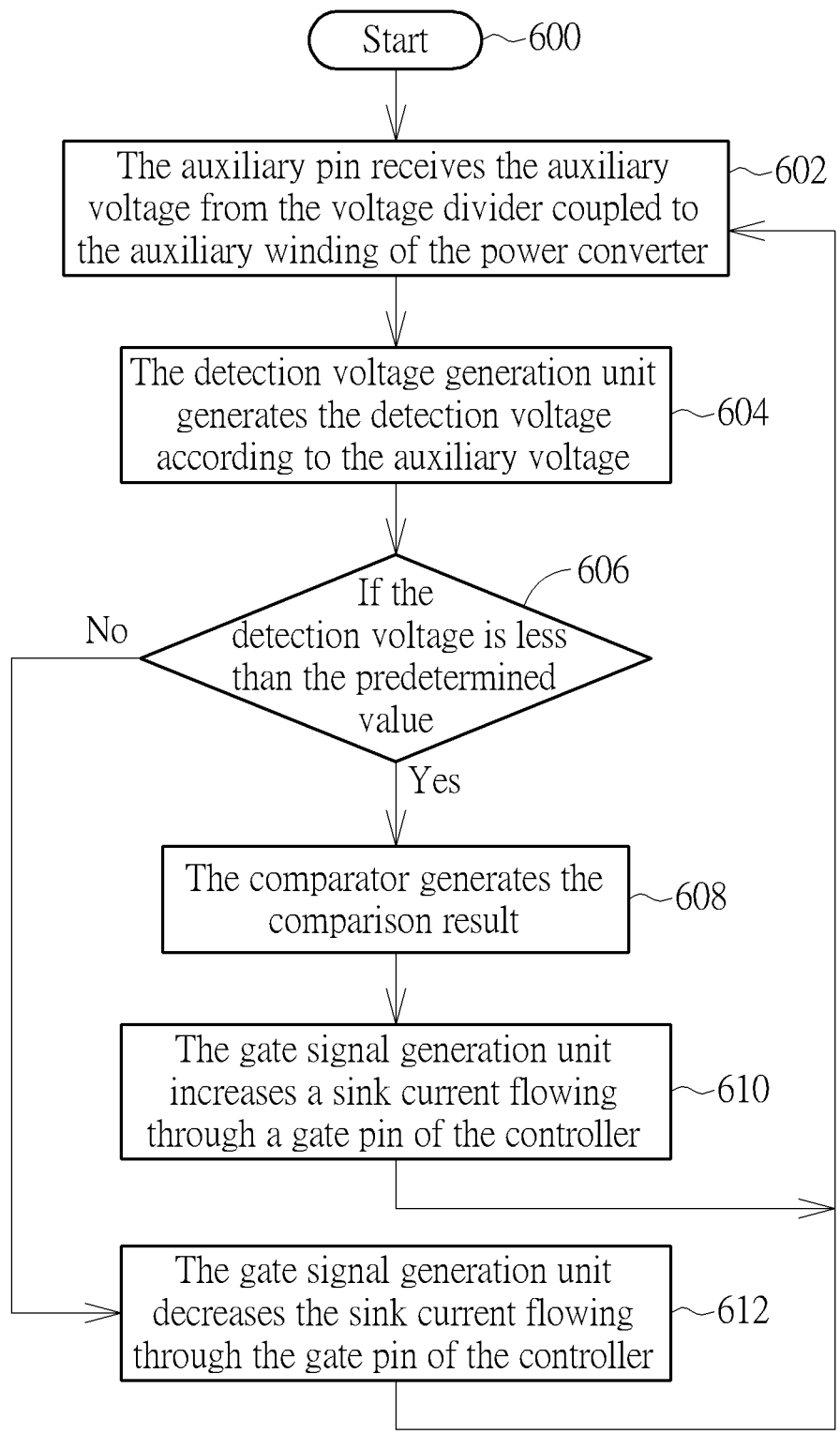
FIG. 6 is a flowchart illustrating a method for increasing efficiency of a power converter according to a fifth embodiment of the present invention.

Please refer to FIGS. 3, 6. FIG. 6 is a flowchart illustrating a method for increasing efficiency of a power converter according to a fifth embodiment of the present invention. The method in FIG. 6 is illustrated using the power converter 100 and the controller 300 in FIG. 3. Detailed steps are as follows:

Step 600: Start.

Step 602: The auxiliary pin 302 receives the auxiliary voltage VAUX from the voltage divider 104 coupled to the auxiliary winding AUX of the power converter 100.

Step 604: The detection voltage generation unit 3042 generates the detection voltage VD according to the auxiliary voltage VAUX.

Step 606: If the detection voltage VD is less than the predetermined value PV; if yes, go to Step 608; if no, go to Step 612.

Step 608: The comparator 3044 generates the comparison result CR.

Step 610: The gate signal generation unit 206 increases a sink current IS flowing through a gate pin 208 of the controller 300, go to Step 602.

Step 612: The gate signal generation unit 206 decreases the sink current IS flowing through the gate pin 208 of the controller 300, go to Step 602.

As shown in FIG. 3, differences between the embodiment of the FIG. 6 and the embodiment of the FIG. 5 is that in Step 602, the auxiliary pin 302 can receive the auxiliary voltage VAUX from the voltage divider 104 coupled to the auxiliary winding AUX of the power converter 100, wherein the auxiliary voltage VAUX corresponds to the DC input voltage DCIV of the primary side PRI of the power converter 100, and the DC input voltage DCIV corresponds to the AC input voltage ACIV inputted to the power converter 100; in Step 604, the detection voltage generation unit 3042 can generate the detection voltage VD according to the auxiliary voltage VAUX. In addition, as shown in FIG. 6, after Step 604 is executed, subsequent operational principles of the embodiment of the FIG. 6 are the same as those of the embodiment of the FIG. 5, so further description thereof is omitted for simplicity.

Figure 7:
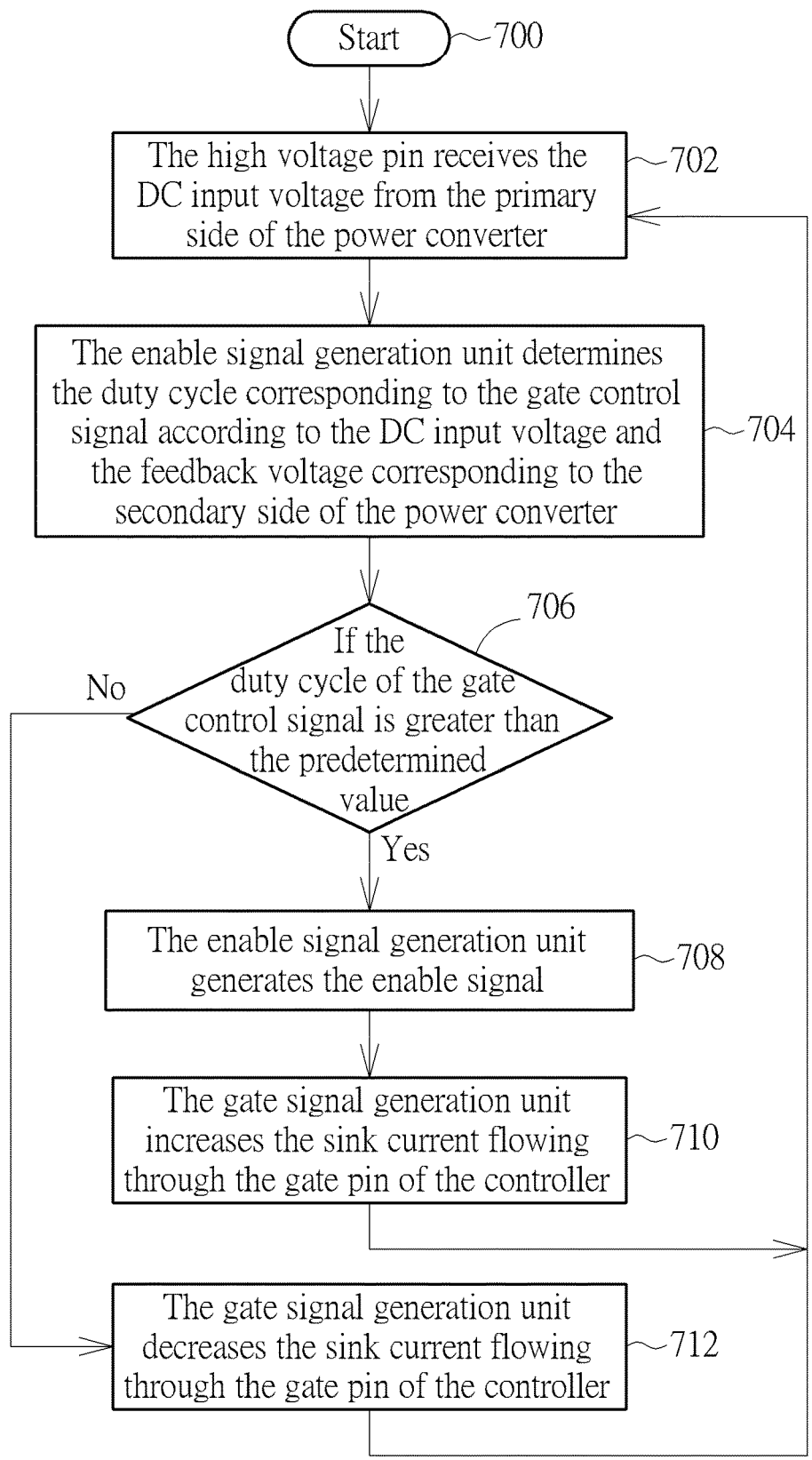
FIG. 7 is a flowchart illustrating a method for increasing efficiency of a power converter according to a sixth embodiment of the present invention.

Please refer to FIGS. 4, 7. FIG. 7 is a flowchart illustrating a method for increasing efficiency of a power converter according to a sixth embodiment of the present invention. The method in FIG. 7 is illustrated using the power converter 100 and the controller 400 in FIG. 4. Detailed steps are as follows:

Step 700: Start.

Step 702: The high voltage pin 202 receives the DC input voltage DCIV from the primary side PRI of the power converter 100.

Step 704: The enable signal generation unit 404 determines the duty cycle D corresponding to the gate control signal GCS according to the DC input voltage DCIV and the feedback voltage VFB corresponding to the secondary side SEC of the power converter 100.

Step 706: If the duty cycle D of the gate control signal GCS is greater than the predetermined value; if yes, go to Step 708; if no, go to Step 712.

Step 708: The enable signal generation unit 404 generates the enable signal ES.

Step 710: The gate signal generation unit 206 increases the sink current IS flowing through the gate pin 208 of the controller 400, go to Step 702.

Step 712: The gate signal generation unit 206 decreases the sink current IS flowing through the gate pin 208 of the controller 400, go to Step 702.

Differences between the embodiment of the FIG. 7 and the embodiment of the FIG. 5 is that in Step 704, the enable signal generation unit 404 can determine the duty cycle D of the gate control signal GCS according to the DC input voltage DCIV of the primary side PRI of the power converter 100, the feedback voltage VFB corresponding to the secondary side SEC of the power converter 100, and equation (1); In Step 708, when the duty cycle D of the gate control signal GCS is greater than the predetermined value, the enable signal generation unit 404 generates the enable signal ES to the gate signal generation unit 206, wherein as shown in equation (1), when the duty cycle D of the gate control signal GCS is greater than the predetermined value, the DC input voltage DCIV is less than the predetermined voltage value, so the enable signal generation unit 404 generates the enable signal ES to the gate signal generation unit 206. In addition, as shown in FIG. 7, after Step 708 is executed, subsequent operational principles of the embodiment of the FIG. 7 are the same as those of the embodiment of the FIG. 5, so further description thereof is omitted for simplicity.

To sum up, the controller for increasing the efficiency of the power converter and the related method thereof utilize the comparison module to generate the detection voltage according to the DC input voltage corresponding to the primary side of the power converter and to compare the detection voltage with the predetermined value to generate the comparison result, and utilize the gate signal generation unit to increase the sink current flowing through the gate pin of the controller according to the comparison result. In addition, the controller and the method can also utilize the enable signal generation unit to generate the enable signal corresponding to the duty cycle of the gate control signal according to the DC input voltage corresponding to the primary side of the power converter and the feedback voltage corresponding to the secondary side of the power converter, and utilize the gate signal generation unit to increase the sink current flowing through the gate pin of the controller according to the enable signal. Therefore, when the sink current flowing through the gate pin of the controller is increased and the gate control signal is changed from high to low, because the sink current flowing through the gate pin of the controller is increased, the gate control signal can be quickly changed from high to low. That is to say, the power switch of the primary side of the power converter can be switched quickly, resulting in the efficiency of the power converter being better. Although when the power switch of the primary side of the power converter is switched quickly, the electromagnetic interference of the power converter is increased, the electromagnetic interference of the power converter can be eliminated easily because the DC input voltage is a low voltage. Therefore, compared to the prior art, the present invention can increase the efficiency of the power converter without significant increase of the cost of the power converter.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller for increasing efficiency of a power converter, the controller comprising:
   an enable signal generation unit electrically connected to a direct current (DC) input terminal of a primary side of the power converter through a high voltage pin of the controller, wherein the enable signal generation unit is used for generating an enable signal corresponding to a duty cycle of a gate control signal according to a DC input voltage of the DC input terminal and a feedback voltage corresponding to a secondary side of the power converter, and the feedback voltage corresponds to an output voltage of the secondary side of the power converter; and
   a gate signal generation unit having two transistors in parallel, wherein a first terminal of a first transistor of the two transistors and a first terminal of a second transistor of the two transistors are coupled to ground, a second terminal of the first transistor is coupled to a gate pin of the controller through a switch comprised in the gate signal generation unit, a second terminal of the second transistor is directly coupled to the gate pin, and a control terminal of the first transistor and a control terminal of the second transistor receive a pulse width modulation signal;
   wherein the gate signal generation unit utilizes the enable signal to control turning-on and turning-off of the switch to change a sink current flowing through the gate pin of the controller, wherein the gate pin is coupled to a power switch of the primary side of the power converter, and the gate signal generation unit is further used for generating a gate control signal to the power switch.

2. The controller of claim 1, wherein the enable signal generation unit generating the enable signal corresponding to the duty cycle of the gate control signal is the enable signal generation unit generating the enable signal when the duty cycle of the gate control signal is greater than a predetermined value.

3. The controller of claim 2, wherein the gate signal generation unit changing the sink current flowing through the gate pin of the controller according to the enable signal is the gate signal generation unit increasing the sink current according to the enable signal when the duty cycle of the gate control signal is greater than the predetermined value.

4. The controller of claim 1, wherein the enable signal generation unit generating the enable signal corresponding to the duty cycle of the gate control signal is the enable signal generation unit generating the enable signal when the duty cycle of the gate control signal is less than a predetermined value.

5. The controller of claim 4, wherein the gate signal generation unit changing the sink current flowing through the gate pin of the controller according to the enable signal is the gate signal generation unit decreasing the sink current according to the enable signal when the duty cycle of the gate control signal is less than the predetermined value.

6. The controller of claim 1, wherein the high voltage pin is used for receiving the DC input voltage of the DC input terminal.

7. A method for increasing efficiency of a power converter, wherein a controller applied to the method comprises a high voltage pin, an enable signal generation unit, and a gate signal generation unit, the enable signal generation unit is electrically connected to a DC input terminal of a primary side of the power converter through the high voltage pin, and the gate signal generation unit has two transistors in parallel, wherein a first terminal of a first transistor of the two transistors and a first terminal of a second transistor of the two transistors are coupled to ground, a second terminal of the first transistor is coupled to a gate pin of the controller through a switch comprised in the gate signal generation unit, a second terminal of the second transistor is directly coupled to the gate pin, and a control terminal of the first transistor and a control terminal of the second transistor receive a pulse width modulation signal, the method comprising:
   the high voltage pin receiving a DC input voltage of the DC input terminal;
   the enable signal generation unit generating an enable signal corresponding to a duty cycle of a gate control signal according to the DC input voltage and a feedback voltage corresponding to a secondary side of the power converter, wherein the feedback voltage corresponds to an output voltage of the secondary side of the power converter; and the gate signal generation unit utilizing the enable signal to control turning-on and turning-off of the switch to change a sink current flowing through the gate pin of the controller according to the enable signal.

8. The method of claim 7, wherein the enable signal generation unit generating the enable signal corresponding to the duty cycle of the gate control signal comprises:
the enable signal generation unit generating the enable signal when the duty cycle of the gate control signal is greater than a predetermined value.

9. The method of claim 8, wherein the gate signal generation unit changing the sink current flowing through the gate pin of the controller according to the enable signal comprises:
the gate signal generation unit increasing the sink current according to the enable signal when the duty cycle of the gate control signal greater than the predetermined value.

10. The method of claim 7, wherein the enable signal generation unit generating the enable signal corresponding to the duty cycle of the gate control signal comprises:
the enable signal generation unit generating the enable signal when the duty cycle of the gate control signal is less than a predetermined value.

11. The method of claim 10, wherein the gate signal generation unit changing the sink current flowing through the gate pin of the controller according to the enable signal comprises:
the gate signal generation unit decreasing the sink current according to the enable signal when the duty cycle of the gate control signal is less than the predetermined value.

* * * * *